(12) United States Patent
Edwards et al.

(10) Patent No.: US 11,964,751 B2
(45) Date of Patent: Apr. 23, 2024

(54) AIRCRAFT ACTUATOR WITH NO-BACK, LOAD DETENT ASSEMBLY

(71) Applicant: Parker-Hannifin Corporation, Cleveland, OH (US)

(72) Inventors: David Edwards, Santa Margarita, CA (US); Abbas M. Charafeddine, Mission Viejo, CA (US); Eric A. Polcuch, Mission Viejo, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 784 days.

(21) Appl. No.: 17/087,669

(22) Filed: Nov. 3, 2020

(65) Prior Publication Data

US 2021/0114717 A1    Apr. 22, 2021

Related U.S. Application Data

(62) Division of application No. 15/581,003, filed on Apr. 28, 2017, now Pat. No. 10,822,074.

(Continued)

(51) Int. Cl.
*B64C 13/28* (2006.01)
*B64C 5/02* (2006.01)
(Continued)

(52) U.S. Cl.
CPC ............... *B64C 13/28* (2013.01); *B64C 5/02* (2013.01); *B64C 5/10* (2013.01); *F16H 25/2454* (2013.01)

(58) Field of Classification Search
CPC ......... B64C 13/14; B64C 13/16; B64C 13/24; B64C 13/28; B64C 13/32; B64C 13/34; B64C 5/02; F16H 25/2454
See application file for complete search history.

(56) References Cited

U.S. PATENT DOCUMENTS 2,959,982 A   12/1957   Cadwallader
4,569,243 A    2/1986   Chapman et al.
(Continued)

FOREIGN PATENT DOCUMENTS

DE    4439436    5/1995
EP    1363178    11/2003
(Continued)

OTHER PUBLICATIONS

Schaeffler KG, Detent Pins for Automotive Transmissions, Product Information, 2007, 30 pages, Schaeffler KG, Germany.

*Primary Examiner* — Benjamin P Lee
(74) *Attorney, Agent, or Firm* — Renner, Otto, Boisselle & Sklar, LLP

(57) ABSTRACT

A load detent assembly for restricting creep of a rotating assembly of an actuator used to actuate an aircraft flight control surface. The load detent assembly includes an engagement member having circumferentially spaced engagement surfaces/protruding portions, and a load detent having a stoppage member radially biasable towards the engagement member for interengagement between the engagement surfaces to restrict creep of the rotating assembly. One of the engagement member or the load detent is configured for rotation radially inward of the other of the engagement member or the load detent through at least 360 degrees of rotation. The other of the engagement member or the load detent is configured for being fixed radially outward of the one of the engagement member or the load detent.

16 Claims, 11 Drawing Sheets

Related U.S. Application Data

(60) Provisional application No. 62/329,386, filed on Apr. 29, 2016.

(51) Int. Cl.
*B64C 5/10* (2006.01)
*F16H 25/24* (2006.01)

(56) References Cited

U.S. PATENT DOCUMENTS

| | | | | |
|---|---|---|---|---|
| 4,834,225 A * | 5/1989 | Klopfenstein | ............ | F16D 67/00 |
| | | | | 188/134 |
| 4,909,363 A * | 3/1990 | Trommer | ................ | F16D 43/02 |
| | | | | 188/134 |
| 5,582,390 A * | 12/1996 | Russ | ....................... | B64C 13/28 |
| | | | | 244/99.2 |
| 5,613,929 A | 3/1997 | Bayer | | |
| 6,109,415 A * | 8/2000 | Morgan | ................... | B64C 13/28 |
| | | | | 192/223.1 |
| 7,293,524 B2 | 11/2007 | Darby | | |
| 7,852,183 B2 | 12/2010 | Potter et al. | | |
| 8,291,782 B1 * | 10/2012 | Shaheen | ............. | F16H 25/2472 |
| | | | | 74/89.34 |
| 8,794,084 B2 * | 8/2014 | Nguyen | ................... | B64C 13/50 |
| | | | | 74/89.26 |
| 9,527,580 B2 * | 12/2016 | Lang | ........................ | B64C 13/28 |
| 9,863,515 B2 * | 1/2018 | Bernard | ................. | B64C 13/341 |
| 10,040,539 B2 * | 8/2018 | Antunes | ................. | F16H 25/2472 |
| 10,065,728 B2 * | 9/2018 | Cyrot | ...................... | B64C 13/343 |
| 10,234,012 B1 * | 3/2019 | Latif | .................. | F16H 25/2204 |
| 10,443,696 B1 * | 10/2019 | Latif | .......................... | B64C 5/02 |
| 10,520,070 B2 * | 12/2019 | Turpin | ................ | F16H 25/2454 |
| 2011/0048147 A1 * | 3/2011 | Keech | .................... | F16H 25/205 |
| | | | | 74/89.26 |
| 2011/0127375 A1 * | 6/2011 | Tallot | ....................... | B64C 13/24 |
| | | | | 244/99.9 |
| 2013/0152717 A1 * | 6/2013 | Kopecek | ............... | F16H 25/2015 |
| | | | | 74/89.39 |
| 2015/0267793 A1 | 9/2015 | Bernard | | |
| 2016/0280356 A1 * | 9/2016 | Medina | ................. | F16H 25/205 |

FOREIGN PATENT DOCUMENTS

| | | | | |
|---|---|---|---|---|
| WO | | 2008155170 | | 12/2008 |
| WO | WO-2011142253 A1 * | | 11/2011 | ............. F16D 65/18 |

* cited by examiner

AIRCRAFT ACTUATOR WITH NO-BACK, LOAD DETENT ASSEMBLY

RELATED APPLICATIONS

This application is a divisional of U.S. patent application Ser. No. 15/581,003 filed Apr. 28, 2017 (now U.S. Pat. No. 10,822,074), which claims the benefit of U.S. Provisional Application No. 62/329,386 filed Apr. 29, 2016, all of which are hereby incorporated herein by reference in their entireties.

FIELD OF INVENTION

The present invention relates generally to aircraft actuators for moving aircraft flight control surfaces, and more particularly to a no-back, load detent assembly for an aircraft actuator.

BACKGROUND

Aircraft typically include a plurality of flight control surfaces that, when controllably positioned, guide movement of the aircraft through the air. The number and type of flight control surfaces included in an aircraft may vary, but typically both primary flight control surfaces and secondary flight control surfaces are included. The primary flight control surfaces are those that are used to control aircraft movement about the pitch, yaw and roll axes, and the secondary flight control surfaces are those that are used to influence the lift or drag (or both) of the aircraft. Although some aircraft may include additional control surfaces, the primary flight control surfaces typically include a pair of elevators, a pair of ailerons and a rudder, and the secondary flight control surfaces typically include a horizontal stabilizer, a plurality of flaps, slats and spoilers.

Modern aircraft have horizontal stabilizers located at the tail section of the fuselage or the rudder section that are pivotably supported relative to the airplane fuselage to "trim" the aircraft during flight by selective adjustment by the pilot via an internal control unit. Adjusting the position of the horizontal stabilizer by a stabilizer actuator accommodates different load distributions within the aircraft and different atmospheric conditions, i.e. wind, rain, snow, temperature variation, etc. The stabilizer is traditionally pivotably connected to the tail section of the fuselage at a point along its length, such as generally midway along its length.

One common trimmable horizontal stabilizer actuator consists of a ball nut assembly connected with an actuating drive gimbal which is pivotably connected to one end of the horizontal stabilizer structure. The ball nut assembly includes a ball nut housing and a ballscrew extending axially and usually vertically through the ball nut housing and through a drive gimbal housing. The ball nut housing is connected to the drive gimbal housing by a trunnion segment. The ballscrew, in turn, may have its proximal end remote from the actuating drive gimbal and may be fixed from translation or axial movement by a connection to a second, support gimbal which is typically pivotably secured to the tail section.

As the ballscrew is rotated, the drive gimbal and ball nut housing will be moved in translation. Thus, as the ballscrew is rotated in one direction, the ball nut housing is moved towards the ballscrew distal end and the leading edge of the horizontal stabilizer is pivoted upward in a first direction. On the other hand, by rotating the ballscrew in an opposite direction, the ball nut housing is moved toward the ballscrew proximal end and the leading edge of the horizontal stabilizer is pivoted downward in a second direction. Rotation of the ballscrew is routinely effected by a motor and associated gearing which is actuated by the pilot via the internal control unit.

SUMMARY OF INVENTION

The present invention provides a load detent assembly for restricting creep (slow movement) of a rotating assembly of an actuator used to actuate an aircraft flight control surface. The load detent assembly includes an engagement member having circumferentially spaced engagement surfaces/protruding portions, and a load detent having a stoppage member radially biasable towards the engagement member for interengagement between the engagement surfaces to restrict creep of the rotating assembly. One of the engagement member or the load detent is configured for rotation radially inward of the other of the engagement member or the load detent through at least 360 degrees of rotation. The other of the engagement member or the load detent is configured for being fixed radially outward of the one of the engagement member or the load detent.

According to one aspect, an actuator for moving a control surface includes an actuator housing, a rotating assembly mounted in the actuator housing having a driven component that is rotatably drivable about a longitudinal axis, and a load detent assembly. The load detent assembly includes an engagement member coupled to one of the driven component of the rotating assembly or the actuator housing, and a load detent supported with respect to the actuator housing for movement relative to the longitudinal axis between a releasing position released from the engagement member and an engaging position interengaged with the engagement member and restricting rotation of the driven component of the rotating assembly relative to the actuator housing. One of the engagement member or the load detent is configured for common rotation with the driven component through at least 360 degrees of rotation.

The load detent assembly may include an engagement member coupled to one of the driven component of the rotating assembly or the actuator housing, and a load detent supported with respect to the actuator housing and engageable with the engagement member to restrict rotation of the driven component of the rotating assembly relative to the actuator housing, wherein one of the engagement member or the load detent is configured for common rotation with the driven component through at least 360 degrees of rotation.

The driven component may be a first driven component that is rotatably drivable about the longitudinal axis to effect movement of a second driven component of the rotating assembly along the longitudinal axis.

The engagement member may be coupled to the driven component for common rotation therewith through at least 360 degrees of rotation.

The driven component may be a screw and the second component may be a nut assembly.

The load detent may be supported with respect to the actuator housing for radial movement relative to the longitudinal axis.

The load detent may include a stoppage member that is supported for the radial movement, and the stoppage member may include a bearing.

The load detent and the engagement member may be configured to interengage upon biasing of a stoppage member of the load detent towards one or more engagement surfaces of the engagement member to restrict relative rotational separation in at least one rotational direction.

The actuator may further include opposing skewed no-back roller assemblies for engaging the driven component.

The engagement member may include lobed engagement surfaces for engaging with the load detent.

A housing of the load detent may be fixed relative to the actuator housing.

The load detent may be configured to be continuously engaged with the engagement member.

The load detent may be configured to be selectively engageable with the engagement member.

According to another aspect, a load detent assembly for restricting creep of a rotating assembly of an actuator includes an engagement member having circumferentially spaced engagement surfaces, and a load detent having a stoppage member radially biasable towards the engagement member for interengagement between the engagement surfaces to restrict creep of the rotating assembly. One of the engagement member or the load detent is configured for rotation radially inward of the other of the engagement member or the load detent through at least 360 degrees of rotation, and the other of the engagement member or the load detent is configured for being fixed radially outward of the one of the engagement member or the load detent.

The stoppage member may include one of a projection or a detent and the engagement surfaces include the other of the projection or the detent, the projection and the detent being interengageable to restrict relative rotation of the load detent and engagement member.

The engagement member may be configured for rotation radially inward of the load detent through at least 360 degrees of rotation, and the load detent may be fixed radially outward of the engagement member.

The engagement member may be annular in shape.

According to yet another aspect, a linear actuator for moving a control surface includes an actuator housing, a nut and screw assembly mounted with respect to the actuator housing and having a screw that is rotatably drivable about a longitudinal axis to drive a nut assembly along the longitudinal axis, and a load detent assembly. The load detent assembly includes an engagement member coupled to one of the screw or the actuator housing, and a load detent supported with respect to the actuator housing and having a stoppage member supported for radial biasing relative to the longitudinal axis between a releasing position released from the engagement member and an engaging position interengaged with the engagement member and restricting rotation of the screw relative to the actuator housing. One of the engagement member or the load detent is configured for common rotation with the screw through at least 360 degrees of rotation.

The stoppage member may be continuously radially biased towards the engagement member via a biasing member.

The stoppage member may include a roller bearing and the biasing member may include a spring.

The foregoing and other features of the invention are hereinafter described in greater detail with reference to the accompanying drawings.

DETAILED DESCRIPTION

The principles of the present invention have particular application to flight control actuators for controlling a flight control surface of a vehicle, such as a stabilizer of an aircraft. The principles are also applicable to other actuators including linear and rotary actuators where there is a need to resist moving the actuator in forward and reverse directions caused by vibrational forces. The forward and reverse directions may be linear directions in the case of a linear actuator or rotational directions in the case of a rotary actuator.

Figure 1:
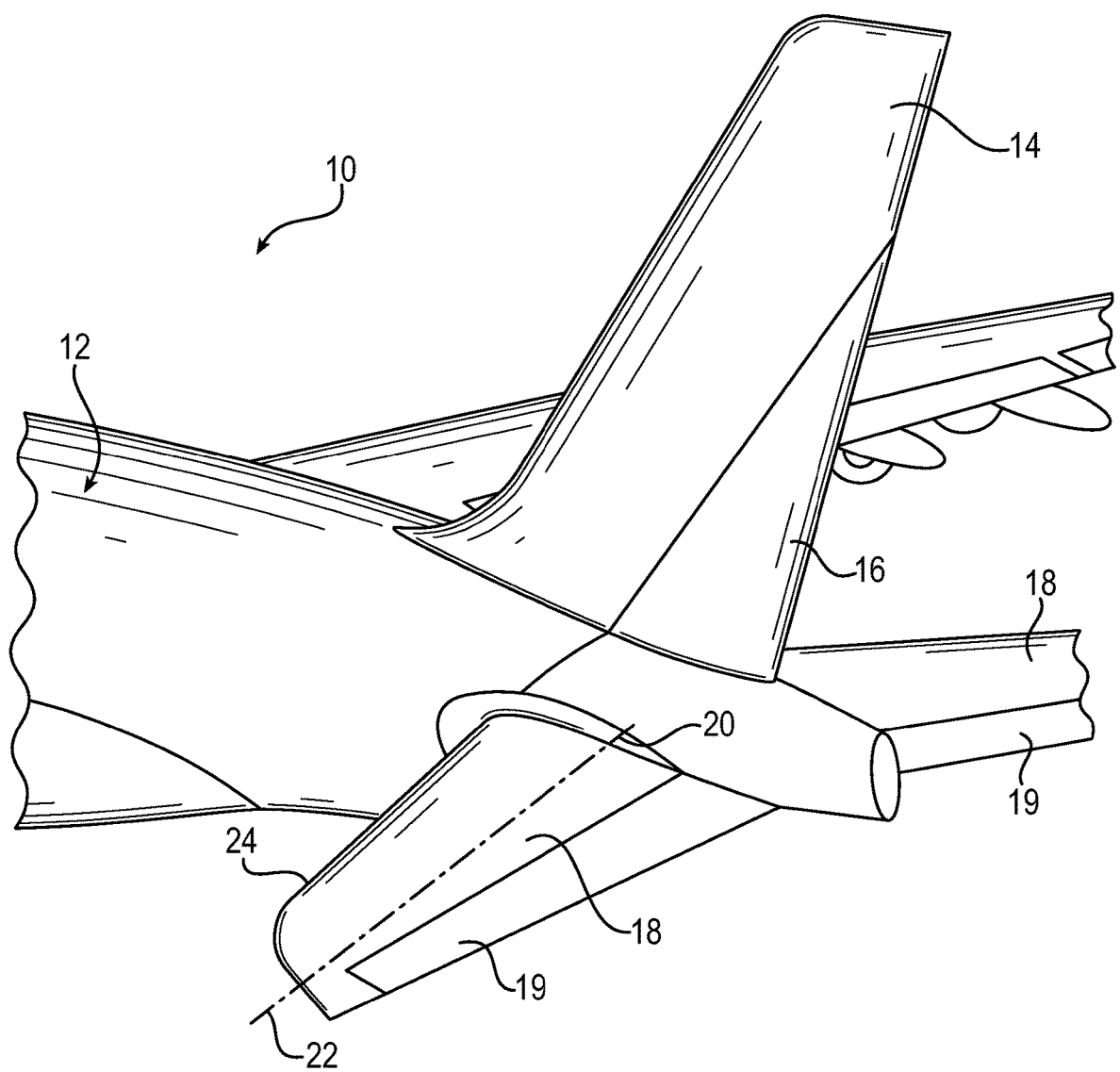
FIG. 1 is an elevational view of an aircraft including an actuator incorporating an exemplary load detent assembly according to the present invention.

Referring first to FIG. 1, an exemplary aircraft 10 includes a rear fuselage 12 having a tail fin 14 which carries a rudder 16. Horizontal stabilizers 18 and elevators 19 are provided on either side of the tail fin 14. Each horizontal stabilizer 18 is pivotably mounted to the fuselage 12 at pivot point 20 whereby it can be pivoted about axis 22 to adjust the longitudinal pitch (i.e., "trim") of the aircraft 10. During flight, each horizontal stabilizer 18 is adjusted by a horizontal stabilizer trim actuator (also herein referred to as an HSTA) which moves the stabilizer's leading edge 24 upward (first direction, aircraft nose down) and downward (second direction, aircraft nose up) relative to the axis 22. The stabilizer adjustments may be automatically controlled directly from the aircraft's flight computers (for example, an automatic flight control unit, or any automatic control unit in other applications) and/or may be manually controlled by pilot input.

As discussed further below, an exemplary HSTA according to the present invention may include a no-back device, such as conventional, skewed roller no-back, for restricting back-driving of the HSTA when not being driven, that otherwise may occur in response to external forces acting on the horizontal stabilizer 18, such as wind, turbulence, change in pressure, etc. In particular situations where the HSTA sees excessive vibration passed through the HSTA, for example caused by backlash from the stabilizer 18 or by vibration passed through an air load, it is conceivable that the no-back assembly may be less effective and the HSTA may creep, causing undesired movement of the horizontal stabilizer 18.

In accordance with the invention, the exemplary HSTA includes a load detent assembly for cooperating with the no-back assembly and the remainder of the HSTA to further restrict or altogether prevent creep of the HSTA and horizontal stabilizer 18, as will be described herein. It will be appreciated that the load detent assembly may also serve as a no-back assembly with other no-back assemblies being omitted.

Figure 2:
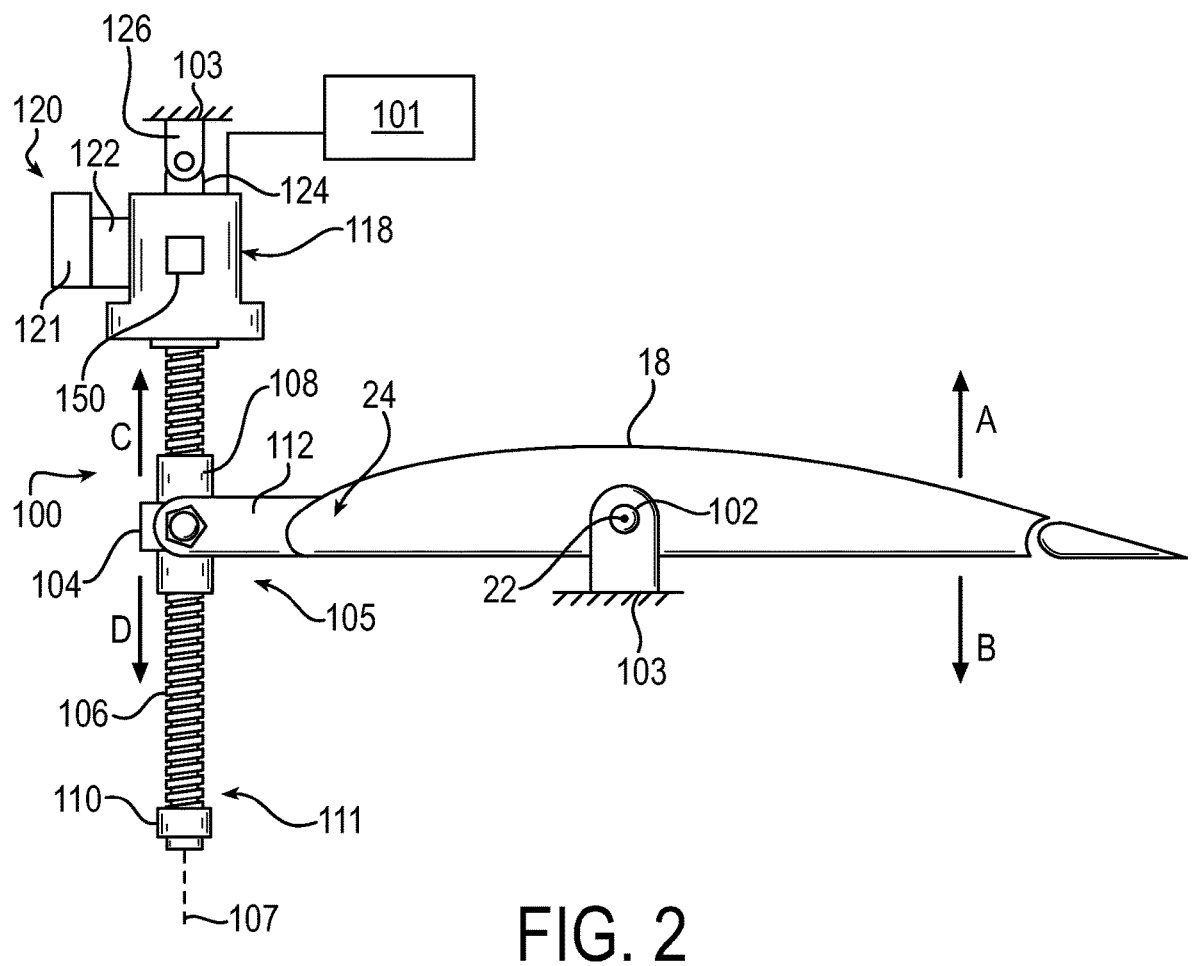
FIG. 2 is a schematic view of an actuator for moving a control surface of the aircraft of FIG. 1, incorporating an exemplary load detent assembly according to the present invention.

Turning now to FIG. 2, an exemplary horizontal stabilizer trim actuator (HSTA) 100 according to the present invention is shown for selectively controlling the position of the horizontal stabilizer 18 (or a control surface, more generally). The actuator 100 is configured to actuate the horizontal stabilizer, for example in response to a command from a controller 101 to move the flight control surface 18. For example, the flight control surface 18 is rotatable about the pivot axis 22, in an upward first direction A or a downward second direction B. It will be appreciated that apparatuses such as an internal control unit 101 are generally well known in the art and thus known details thereof have been omitted for purposes of brevity and simplicity.

The horizontal stabilizer 18 may be pivotably connected along its length to a pivoting stabilizer gimbal structure 102, also herein referred to as a stabilizer gimbal 102. The stabilizer gimbal 102 is attached to the vertical stabilizer section or fuselage tail section 103 of the fuselage 12. The forward end 24 of the horizontal stabilizer 18 may be in turn pivotably connected to an actuating drive gimbal 104 located generally midway along the actuator 100 and which in turn is pivotably connected to a rotating assembly of the actuator 100, such as a nut and screw assembly 105. The details of connection of stabilizer actuators to the rudder section or fuselage tail section have been omitted for purposes of brevity and simplicity.

The depicted actuator 100 is shown as a linear actuator that is driven to effect movement of the stabilizer (or a driven component in other applications) along a longitudinal axis. The actuator 100 includes a rotating assembly, such as the nut and screw assembly 105, connected to the horizontal stabilizer 18 for controlling movement of the stabilizer 18. The nut and screw assembly 105 is driven by a drive unit 120.

The drive unit 120 may include, for example, a hydraulic or electric drive motor 121 and a gearbox assembly 122. The drive unit 120 is provided for rotatingly driving the rotating assembly/nut and screw assembly 105, to effect movement of a driven component of the nut and screw assembly 105. The drive unit 120 and the details thereof are of a construction well known in the art and thus it is only generally shown and described for purposes of simplicity and brevity.

Further, the drive motor 121 for the actuator 100 described herein need not be an electric motor. The drive unit 120 could additionally or alternatively comprise hydraulic and/or pneumatic cylinders, or any other device which can effect movement of the actuatable surface 18.

The depicted drive motor 121 drives the nut and screw assembly 105, which includes a first driven component that is driven by the motor 121 to effect movement of a second driven component. More particularly, the first driven component of the depicted nut and screw assembly 105 is a ball screw 106. The second driven component of the depicted nut and screw assembly 105 is a ball nut assembly 108 for translating along the ball screw 106. The translation of the ball nut assembly 108 is along a longitudinal axis 107. The translation is effected by rotation of the ball screw 106 about the same axis 107. Thus, the ball screw 106 is driven by the motor 121 to effect linear translation of the ball nut assembly 108 along the longitudinal axis 107.

The ball nut assembly 108 is coupled to a drive gimbal 104 and is located generally midway along the screw 106. An extend mechanical stop 110 may be attached to a distal end 111 of the ball screw 106 to assure that the ball nut assembly 108 will not be unthreaded from the ball screw 106. The nut and screw assembly 105 and the details thereof are of a construction well known in the art and thus it is only generally shown and described for purposes of simplicity and brevity.

It will be appreciated that the principles of the invention are also applicable to an actuator having a screw assembly including a drive screw or lead screw or having a translating screw and a rotating nut. For example, the first driven component driven by a motor may be a ball nut assembly. Such ball nut assembly may be rotated by the motor to effect translation of a screw. The screw may be a second driven component, translationally driven along a respective longitudinal axis about which the ball nut assembly is rotated by the motor. Further, the principles of the invention are equally applicable to other types of screws, such as lead screws or roller screws, for example. Also, the principles apply to other suitable types of linear actuators and to rotary actuators.

The illustrated actuator 100 is configured to extend and retract thereby moving a force transfer member 112, secured to the drive gimbal 104. The force transfer member 112 couples a suitable location of the actuator 100, such as the ball nut assembly 108, to a suitable location of the respective stabilizer 18. The ball nut assembly 108 and force transfer member 112 are movable in an upward third direction C (corresponding to movement of the stabilizer 18 in the downward second direction B) and an opposite downward fourth direction D (corresponding to movement of the stabilizer 18 in the upward first direction A).

As used herein, the upward and downward directions refer to one alignment of the HSTA 100 in the fuselage of an aircraft, where in level flight or landed on a ground surface, an HSTA is often aligned vertically with respect to the ground surface. Thus, a downward/distal end of the HSTA is located nearer the ground than the opposite upward/proximal end of the HSTA. In other words, in such orientation, upward is meant to refer to a direction towards a proximal end 127 of the screw 106 adjacent the drive unit 120, and downward is meant to refer to a direction towards the distal end 111 of the screw 106 opposite the drive unit 120. The terms are not meant to be limiting, but refer to opposing directions along the longitudinal axis 107, which could be otherwise aligned relative to the ground, fuselage, or control surface 18. Also as used herein, coupling may include direct or indirect coupling.

Figure 3:
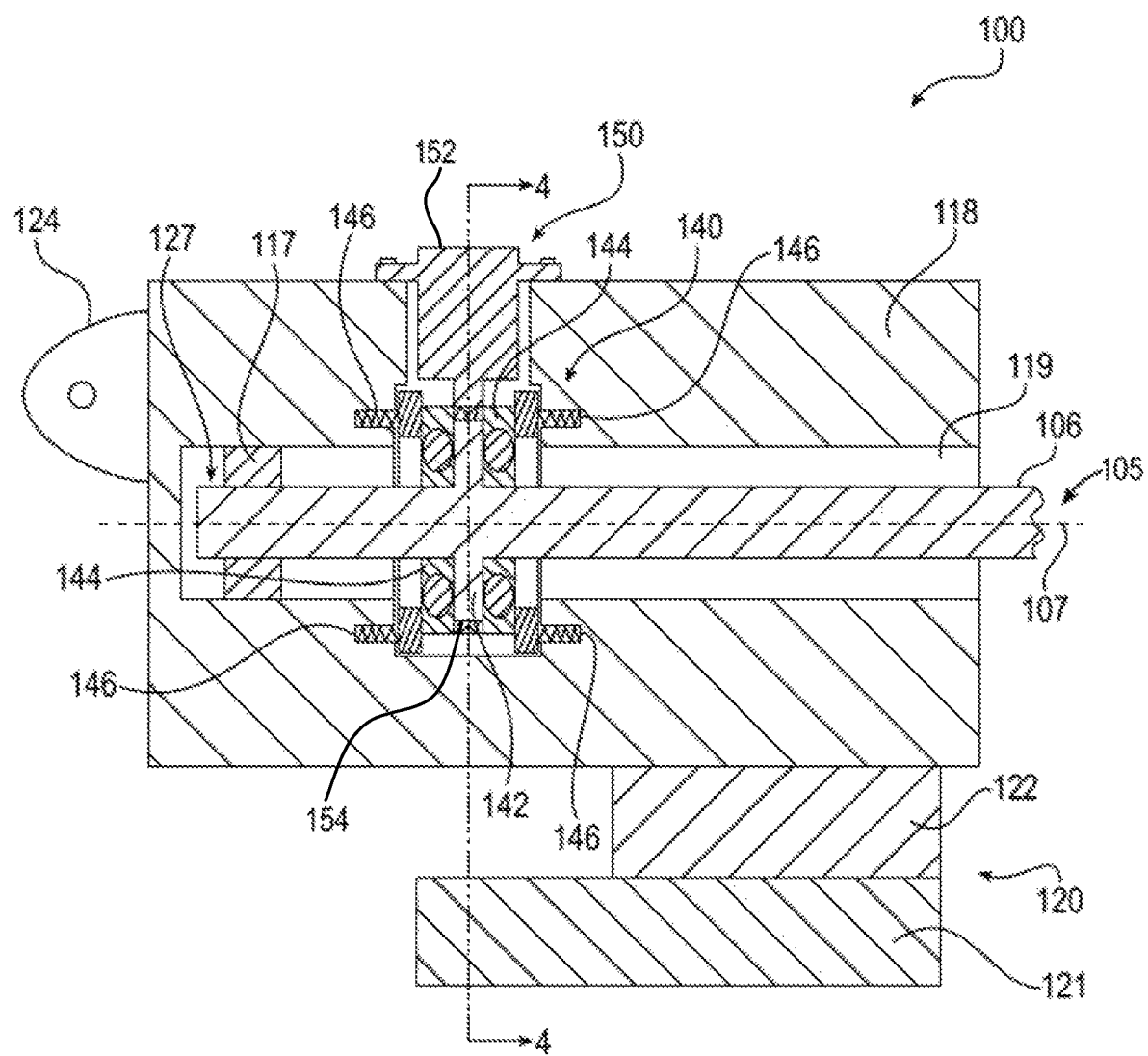
FIG. 3 is an elevational view of the actuator as shown in FIG. 2, partly broken away in section, and including the exemplary load detent assembly.
Figure 4:
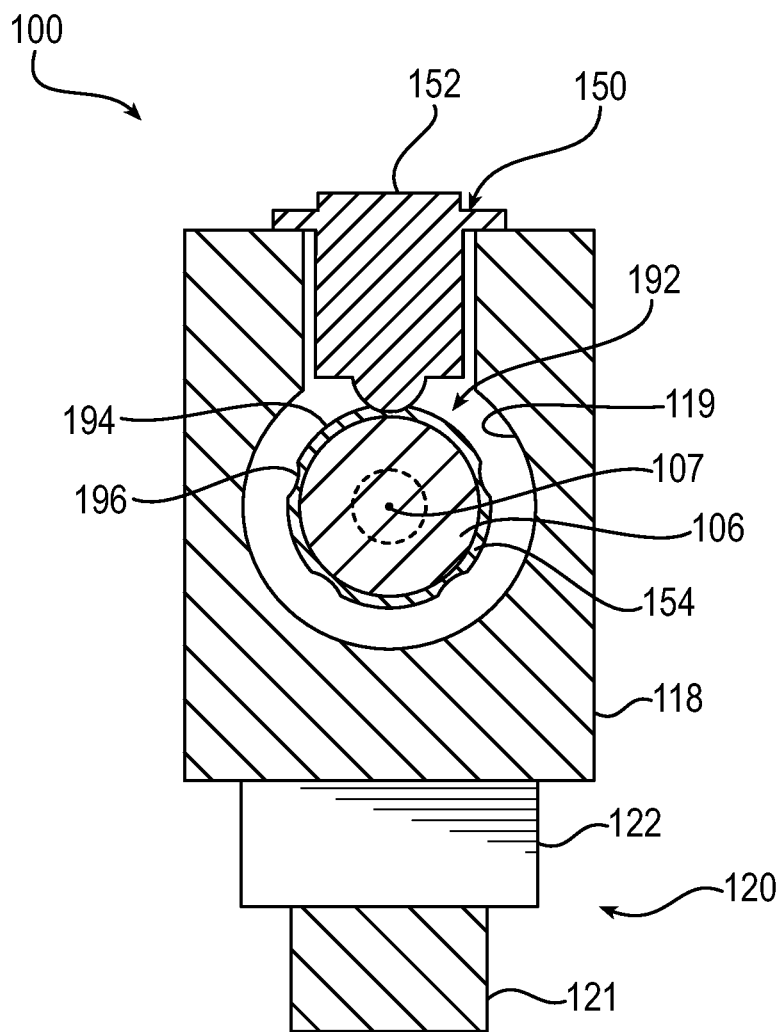
FIG. 4 is another elevational view of the actuator as shown in FIG. 3, partly broken away in section, incorporating the exemplary load detent assembly.

Looking in particular to FIGS. 2 and 3, the nut and screw assembly 105 extends generally along the longitudinal axis 107, which extends through a no-back housing 118. The screw 106 of the screw assembly 105 is received in a cavity 119 of the no-back housing 118. The proximal end 127 of the screw 106 is supported by one or more bearings 117, such as a bushing, ball bearing or a roller bearing.

The illustrated no-back housing 118 is connected to the drive unit 120. One or more flanges 124 extend from the no-back housing 118 for connecting to a primary support gimbal 126 which in turn is pivotably secured to a portion of the fuselage tail section 103, such as to the vertical stabilizer section or tail section (more generally, a reference structure). The no-back housing 118 may include one or more components, such as a bottom housing portion and a top cover portion.

The primary support gimbal 126 and the drive gimbal 104, enable the stabilizer actuator 100 to pivot in response to backlash or energization of the drive motor 121, while the horizontal stabilizer 18 may pivot at each of the drive gimbal 104 and stabilizer gimbal 102. This pivoting accommodates the angular, arcuate displacement of the forward end 24 of the stabilizer 18.

Turning now to the no-back features of the actuator 100, the actuator 100 is configured to restrict or all-together prevent slipping of the nut and screw assembly 105 and back-driving of the drive unit 120 in response to external load on the stabilizer 18, while the actuator 100 is stationary/not actuating. In this way, the actuator 100 is a no-back type actuator configured to resist both aiding and opposing external loads (acting on the actuator, such as from external forces), allowing the actuator 100 to comply with relevant vehicle requirements.

The actuator 100 includes both a no-back assembly 140 and a load detent assembly 150 to provide many no-back and anti-creep features of the stabilizer actuator 100. The no-back assembly 140 is provided to resist aiding loads while the actuator is non-active. The load detent assembly 150 is provided for cooperating with the no-back assembly 140 (when provided) and the remainder of the actuator 100 to restrict or altogether prevent creep of the stabilizer 18 and more generally the gear train of the actuator 100 when the actuator 100 is inactive. The gear train referred to includes, but is not limited to, the drive motor 121, the gear set 122, and the rotating assembly/nut and screw assembly 105, including the screw 106 driven by the motor 121 and the nut assembly 108 translated by the screw 106.

The no-back assembly 140 acts on a screw flange 142 projecting radially outward from the proximal end 127 of the screw 106. The no-back assembly 140 includes a set of opposed skewed roller no-back devices 144 that are spring-biased via springs 146 towards opposing sides of the screw flange 142. In response to tension or compression loading on the actuator 100, the screw 106 is generally caused to move minimally axially. For example, the screw 106 may move about 0.005 inches in either longitudinal direction along the axis 107 in one embodiment.

When acted on by a compression load, the screw flange 142 is axially pressed against one skewed roller no-back device 144, restricting rotation in one rotational direction. Likewise, when acted on by a tension load, the screw flange 142 is axially pressed against the other skewed roller no-back assembly 144, restricting rotation in an opposite rotational direction. Thus the no-back assembly 140 includes opposing skewed roller no-back devices 144 for responding to tension and compression loading. It will be appreciated that the skewed roller no-back devices are configured to allow rotation of the screw 106 in opposed rotational directions when the drive motor 121 is activated.

Figure 5:
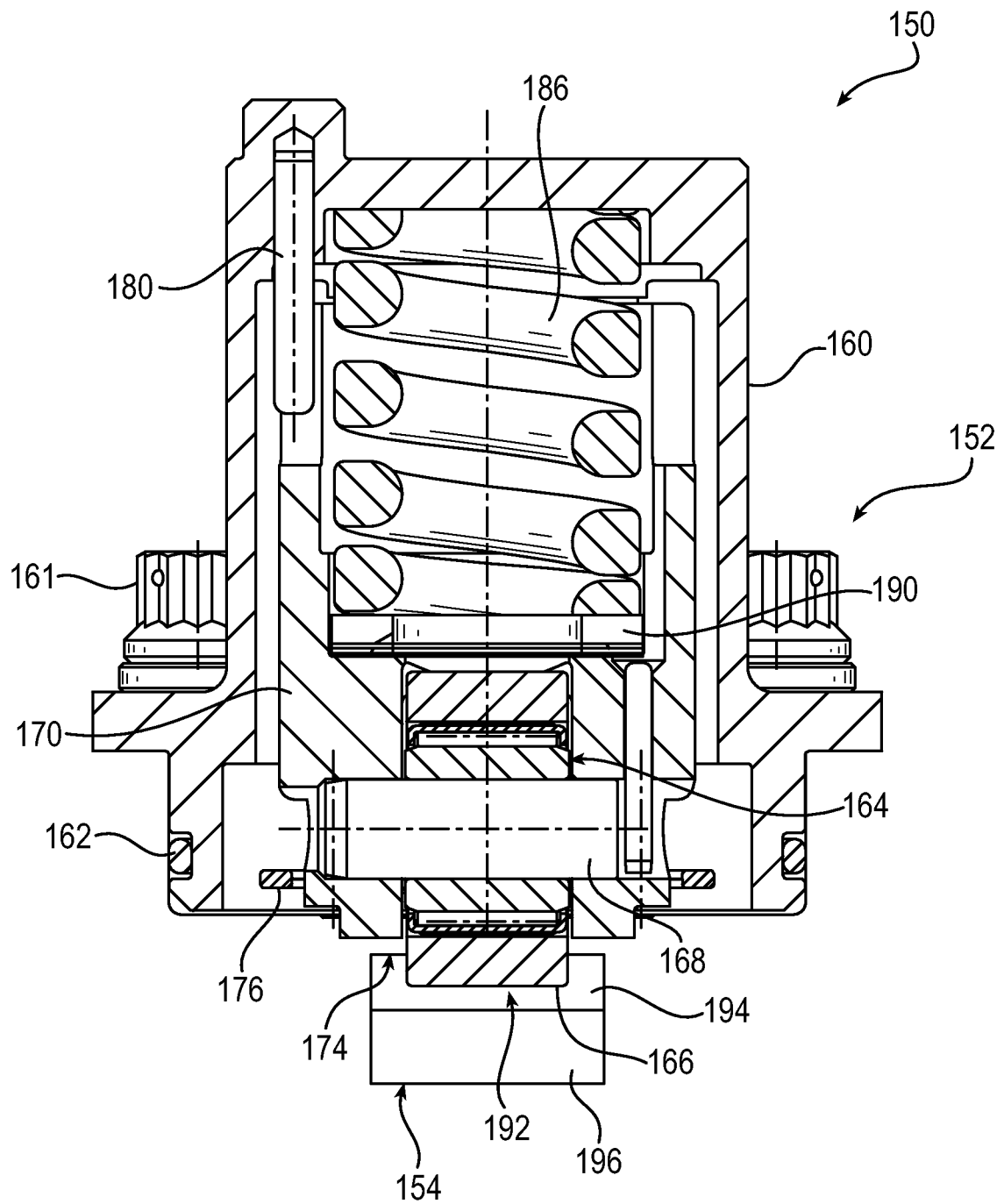
FIG. 5 is another elevational view of the actuator as shown in FIG. 3, partly broken away in section, incorporating the exemplary load detent assembly.
Figure 6:
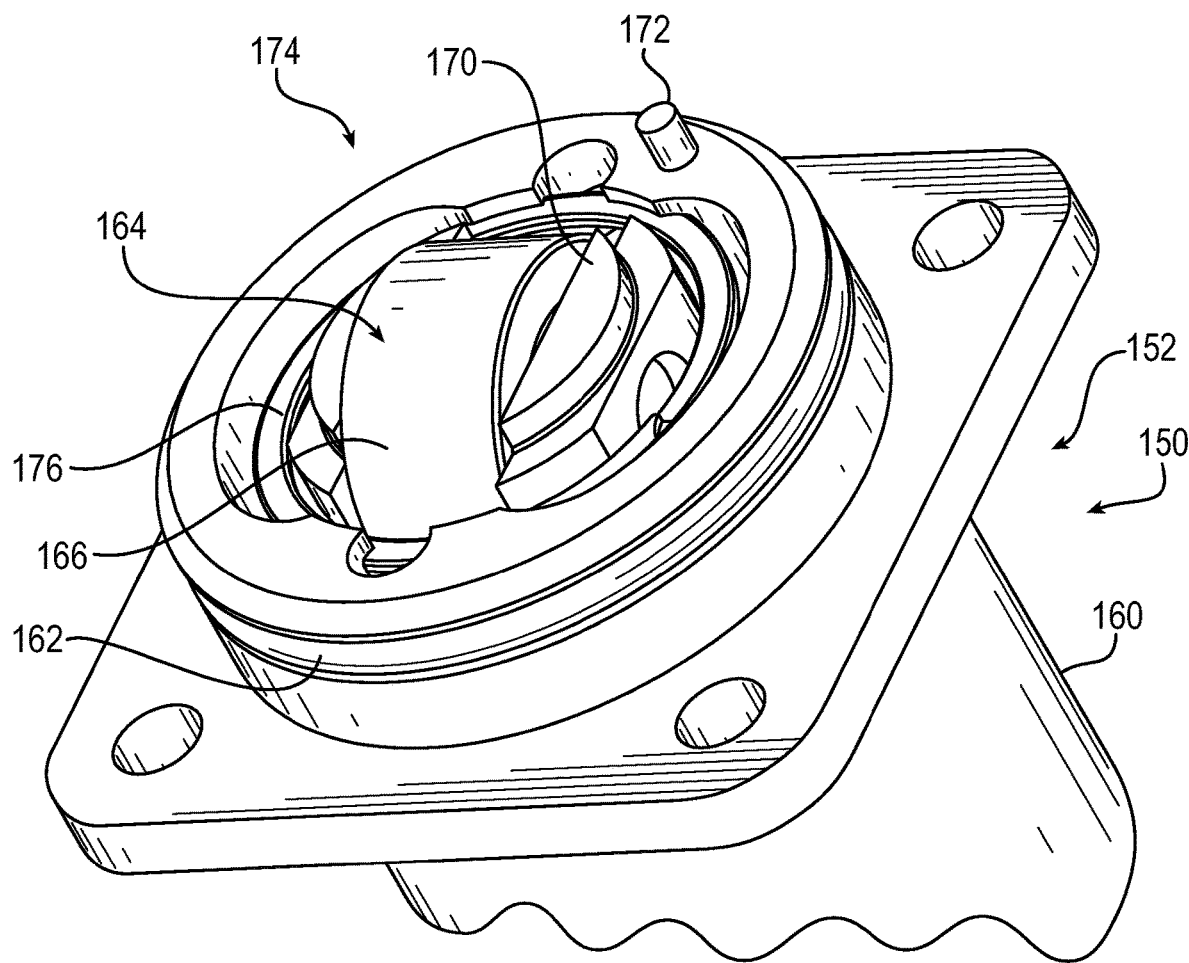
FIG. 6 is a partial elevational view of the load detent assembly of FIG. 3.

Turning now to FIGS. 5 and 6, the exemplary load detent assembly 150 is shown in greater detail. Although shown for use with the actuator 100, the load detent assembly 150 may be used in conjunction with an actuator having a different no-back assembly than the no-back assembly 140, or an actuator altogether omitting the no-back assembly 140 or equivalent.

The exemplary load detent assembly 150 is provided to restrict rotation of a rotating gear train component, and in the depicted embodiment is provided to restrict rotational movement and/or creep of the proximal end 127 of the screw 106. The depicted load detent assembly 150 functions to restrict rotation of the screw 106 in response to both tension and compression (aiding and opposing) loads acting on the stabilizer 18, when the drive unit 120 is not acting to drive the nut and screw assembly 105.

It will be appreciated that the load detent assembly 150 is configured to allow rotation of the screw 106 in opposed rotational directions when the drive motor 121 is activated. Thus, any restriction force of the load detent assembly 150 on the screw 106 is able to be overcome via a driving force of the motor 121.

One or more load detent assemblies 150 may be incorporated. It will be appreciated that the load detent assembly 150 may be otherwise located with respect to the remainder of the actuator 100 to restrict rotation/creep of another portion of the screw 106, such as its opposite distal end 111 (FIG. 2), or in other embodiments to restrict rotation of a component or portion of the drive motor 121, the gear set 122, or the nut assembly 108.

The load detent assembly 150 includes a load detent 152 and an engagement member 154 for interengaging with one another to restrict rotation of the screw 106. Generally, one of the engagement member 154 or the load detent 152 is configured for common rotation with the driven component, such as the screw 106, through at least 360 degrees of rotation. The load detent 152 is generally supported with respect to the actuator housing, such as the no-back housing 118, for movement relative to the longitudinal axis 107. And the engagement member 154 is generally coupled to one of the driven component, such as the screw 106, or the actuator housing, such as the no-back housing 118.

As depicted, the engagement member 154 may generally be coupled to the rotating assembly/nut and screw assembly 105, such as to the driven screw 106. The illustrated engagement member 154 is configured for common rotation about the longitudinal axis 107 with the screw 106 through at least 360 degrees of rotation. For example, the engagement member 154 is attached to the proximal end 127 of the screw 106 for the common rotation therewith.

In other embodiments, it will be appreciated that the engagement member 154 could be coupled to another portion of the screw 106, or to another rotating component of nut and screw assembly 105, for rotation relative to the load detent 152.

Turning now to specifics of the illustrated engagement member 154 (see, e.g., FIG. 3), the engagement member 154 is attached to a radially outer surface of the proximal end 127 of the screw 106. The engagement member 154 is depicted as an annular member, although other shapes may be suitable. The attachment of the engagement member 154 to the screw 106 may be by way of fasteners, pins, welding, etc. In other embodiments, the engagement member 154 may be coupled to a different component of the HSTA 100, such as to a component or portion of the drive motor 121, the gear set 122, or the nut assembly 108. In some embodiments, fasteners may be omitted, and the engagement member 154 may be integral with the screw 106, such as the screw flange 142, or other corresponding component.

A radially outer surface of the engagement member 154 includes circumferentially spaced engagement surfaces, such as protruding portions 192, that protrude radially outwardly to define therebetween recessed regions 196 (detents of the engagement member 154) located circumferentially to either side thereof. The depicted protruding portions 192 are equally circumferentially spaced, although other arrangements may be suitable. Sides of the protruding portions 192 gradually rise from the recessed regions 196 so as to function as ramps that facilitate passage of the detent member 152 over the protruding portions 192 when the screw 106 is driven.

Turning to specifics of the illustrated load detent 152 (see, e.g., FIGS. 5 and 6), in the depicted embodiment of the load detent assembly 150 the load detent 152 is supported for movement relative to the longitudinal axis 107 between a restricting position and a non-restricting position. In the restricting position, the load detent 152 restricts rotation of the driven screw 106 relative to the actuator housing, such as with respect to the no-back housing 118. In the non-restricting position, the load detent 152 does not restrict rotation of the drive screw 106. The load detent 152 is grounded relative to the engagement member 154, such as being supported with respect to the actuator housing, such as via coupling to the no-back housing 118.

To support components of the load detent 152, a detent housing 160 is attached to the no-back housing 118 by fasteners 161. An alignment pin 172 is received in the detent housing 160 and is also received into a corresponding slot in the no-back housing 118, to enable alignment of the load detent 152 with the engagement member 154. The detent housing 160 may be integral with the no-back housing 118 in some embodiments. In other embodiments, any suitable fasteners may be used.

A seal 162, such as an o-ring, is disposed between the detent housing 160 and the no-back housing 118.

A stoppage (detent) member 164 is biased into engagement with the engagement member 154. The depicted stoppage member 164 includes a bushing or bearing, such as a roller bearing 166. In other embodiments, any other suitable bearing (roller) or bushing (non-roller) may be used.

The roller bearing 166 is supported on a pin axle 168 that is rotatably supported, with respect to, such as in, a plunger 170. An alignment pin 172 is received into a corresponding slot of the plunger 170 to align the pin axle 168 and the roller bearing 166 relative to the engagement member 154.

The plunger 170 and the stoppage member 164 are jointly movable in the detent housing 160 and are supported for radial movement relative to the longitudinal axis 107. In the depicted embodiment, such radial movement is radially inward movement with respect to the no-back housing 118, toward the longitudinal axis 107. Generally, the stoppage member 164 is supported for movement in the detent housing 160 between the non-restricting position released from recessed regions 196 of the engagement member 154 and a restricting position engaged with a recessed region 196 of the engagement member 154. When in the restricting position, the stoppage member 164 is trapped in a recessed region 196 between circumferentially adjacent protruding portions 192 to restrict rotation of the engagement member 54, such as when not being driven along with the screw 106. When in the non-restricting position, the stoppage member 164 is not located in a recessed region 196.

The stoppage member 164, via the plunger 170, is biased, such as linearly biased, towards an open end 174 of the detent housing 160 towards the engagement member 54. A retaining member, such as a retaining ring 176, is received in a corresponding slot of the plunger 170. The retaining ring 176 limits movement of the plunger 170 relative to the detent housing 160 to prevent complete separation therefrom.

A guide pin 180 is received into corresponding slots of each of the plunger 170 and the detent housing 160 to prevent rotation of the plunger 170 relative to the detent housing 160. In this way, alignment of the stoppage member 164 relative to the engagement member 154 is maintained.

A biasing member 186 is disposed between the detent housing 160 and the plunger 170 for biasing the plunger 170 and the stoppage member 164 in the engaging position for engaging the engagement member 154. The depicted biasing member 186 is a resilient member, and in particular a spring, such as a coiled spring. Other suitable biasing members may be used in other embodiments.

A spacer 190 is located between the biasing member 186 and the plunger 170. During assembly, the spacer 190 may be varied to provide a spacer 190 with a desired thickness to control the biasing force applied to the plunger 170 by the biasing member 186.

In use, the engagement member 154 and the load detent 152 are engaged with one another via the biasing member 186. In response to a force acting on the control surface 18 (FIG. 2), the screw 106 may be caused to rotate (be back-driven). Regardless of direction of creep of the screw 106, relative rotational movement of the engagement member 154 relative to the load detent 152 is restricted when the drive unit 120 is not active in driving the nut and screw assembly 105. This is because the biasing force of the biasing member 186 prevents the stoppage member 164 from being retracted (maintains the default position of the load detent 152), thus preventing a respective protruding portion 192 adjacent a recessed region 196 in which the stoppage member 164 is engaged from rotating past the stoppage member 164. As previously mentioned, the drive motor 121 is sized such that a driving force of the drive motor 121 is greater than a biasing force of the biasing member 186, enabling protruding portions 192 of the engagement member 154 to be rotated past the load detent 152 when the drive motor 121 is activated.

It is noted that in some embodiments the interaction of the load detent 152 and the engagement member 154 creates a ripple in the motor current of the drive motor 121. Monitoring of the motor current to detect such ripples may allow for determination of whether the actuator 100 is properly operating. For example, the current may ripple due to load detent 152 riding up and over one or more successive protruding portions 192 of the engagement member 154.

In summary, with respect to possible embodiments of a load detent assembly 150, one of the load detent 152 and the engagement member 154 is configured for being fixed relative to the actuator housing 118, radially outward of the other of the load detent 152 and the engagement member 154. The other of the load detent 152 and the engagement member 154 is configured for rotation radially inward of the one of the load detent 152 and the engagement member 154. In the depicted embodiment of FIGS. 5 and 6, the load detent 152 is configured for being fixed relative to the actuator housing 118, radially outward of the engagement member 154. The engagement member 154 is thus configured for rotation radially inward of the load detent 152.

Figure 7:
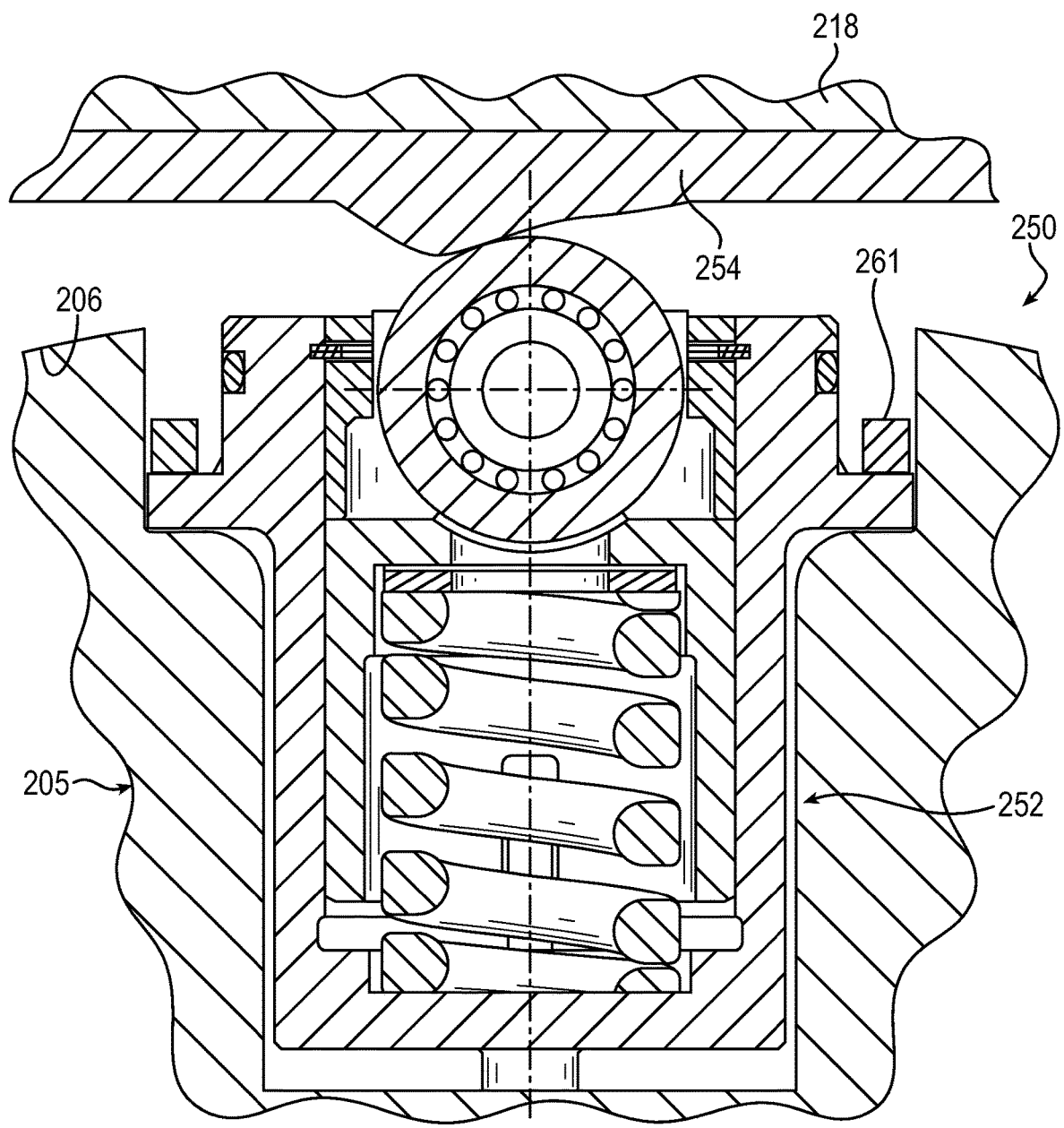
FIG. 7 is a partial elevational view of another exemplary load detent assembly according to the present invention, partly broken away in section.

In some embodiments, the construction may be vice versa, where the engagement member is configured for being fixed relative to an actuator housing, outward of the load detent. In such case, the load detent would be configured for rotation radially inward of the engagement member. For example, the embodiment of FIG. 7 illustrates a load detent assembly 250 having a load detent 252 configured for common rotation through at least 360 degrees of rotation with a screw 206 of a nut and screw assembly 205. The load detent 252 is fixed to a radially outer surface of the screw 206, such as by fasteners 261. In the embodiment of FIG. 7, the engagement member 254 is fixed relative to a respective actuator housing 218, such as via fasteners (not shown), instead of the detent assembly being fixed to the actuator housing as in the embodiment of FIGS. 2-6.

Figure 8:
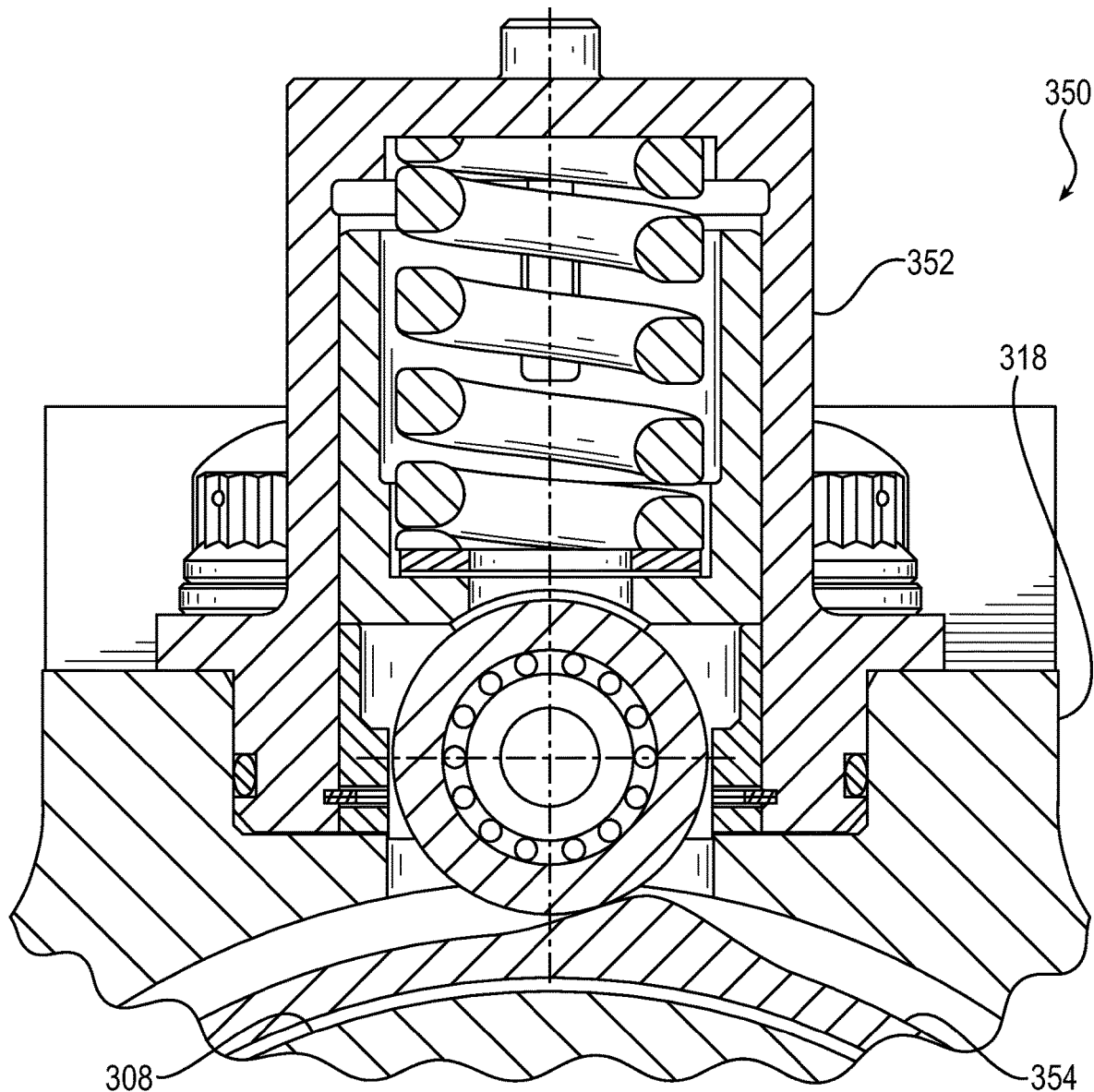
FIG. 8 is a partial elevational view of yet another exemplary load detent assembly according to the present invention, partly broken away in section.

Turning next to FIG. 8, it will be appreciated that even further embodiments of an HSTA may include a rotationally driven nut assembly for translationally driving a screw (not shown). In such case, one of an engagement member and a load detent of a load detent assembly may be coupled to the nut assembly for common rotation therewith through at least 360 degrees of rotation. The other of the load detent and the engagement member may be fixed relative to a respective actuator housing. In the case of FIG. 8, an engagement member 354 is coupled to a nut assembly 308 for common rotation therewith through at least 360 degree of rotation. A corresponding load detent 352 of the load detent assembly 350 is fixed relative to a respective actuator housing, such as to an actuator housing 318.

Figure 9:
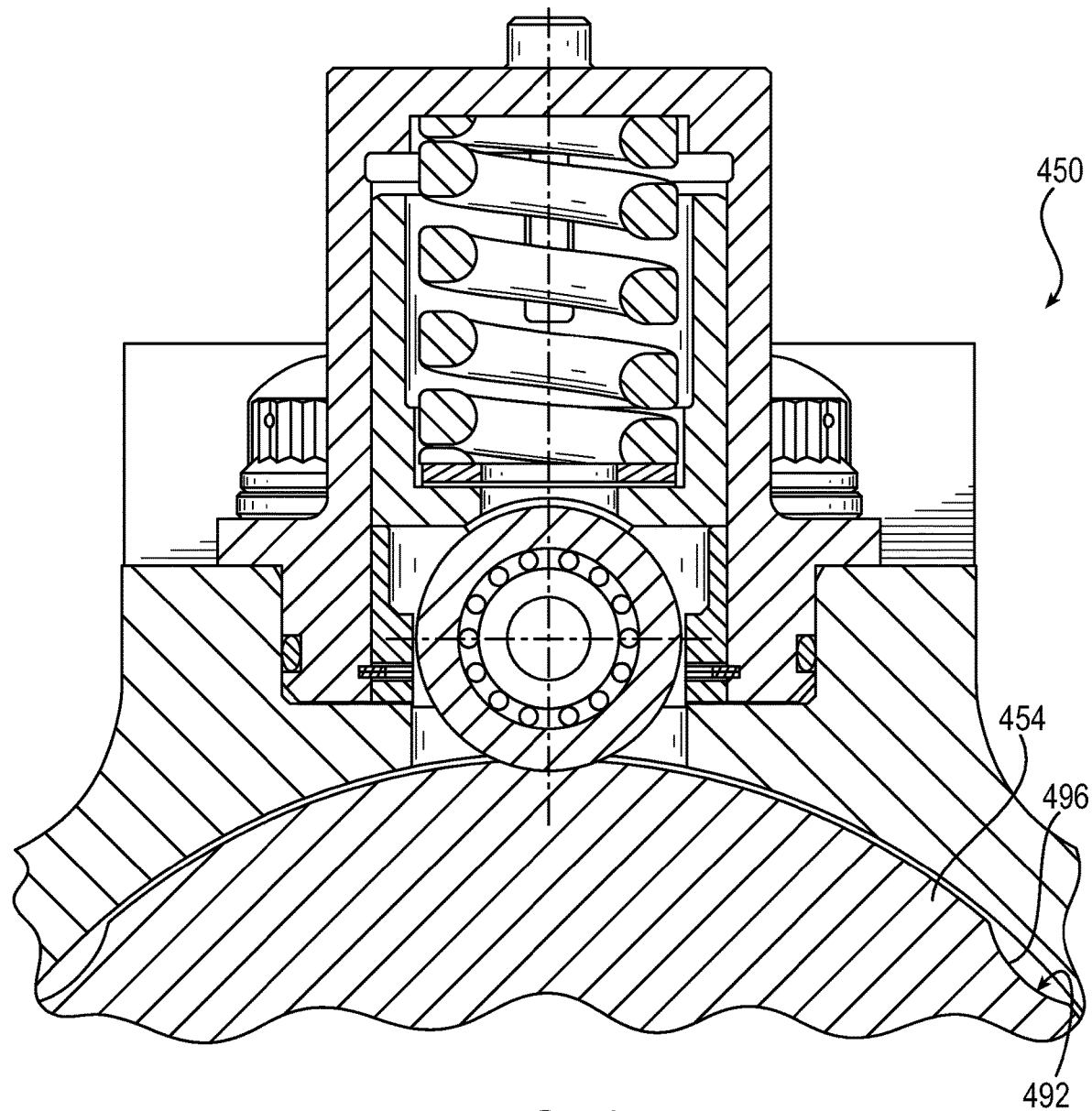
FIG. 9 is a partial elevational view of still another exemplary load detent assembly according to the present invention, partly broken away in section.
Figure 10:
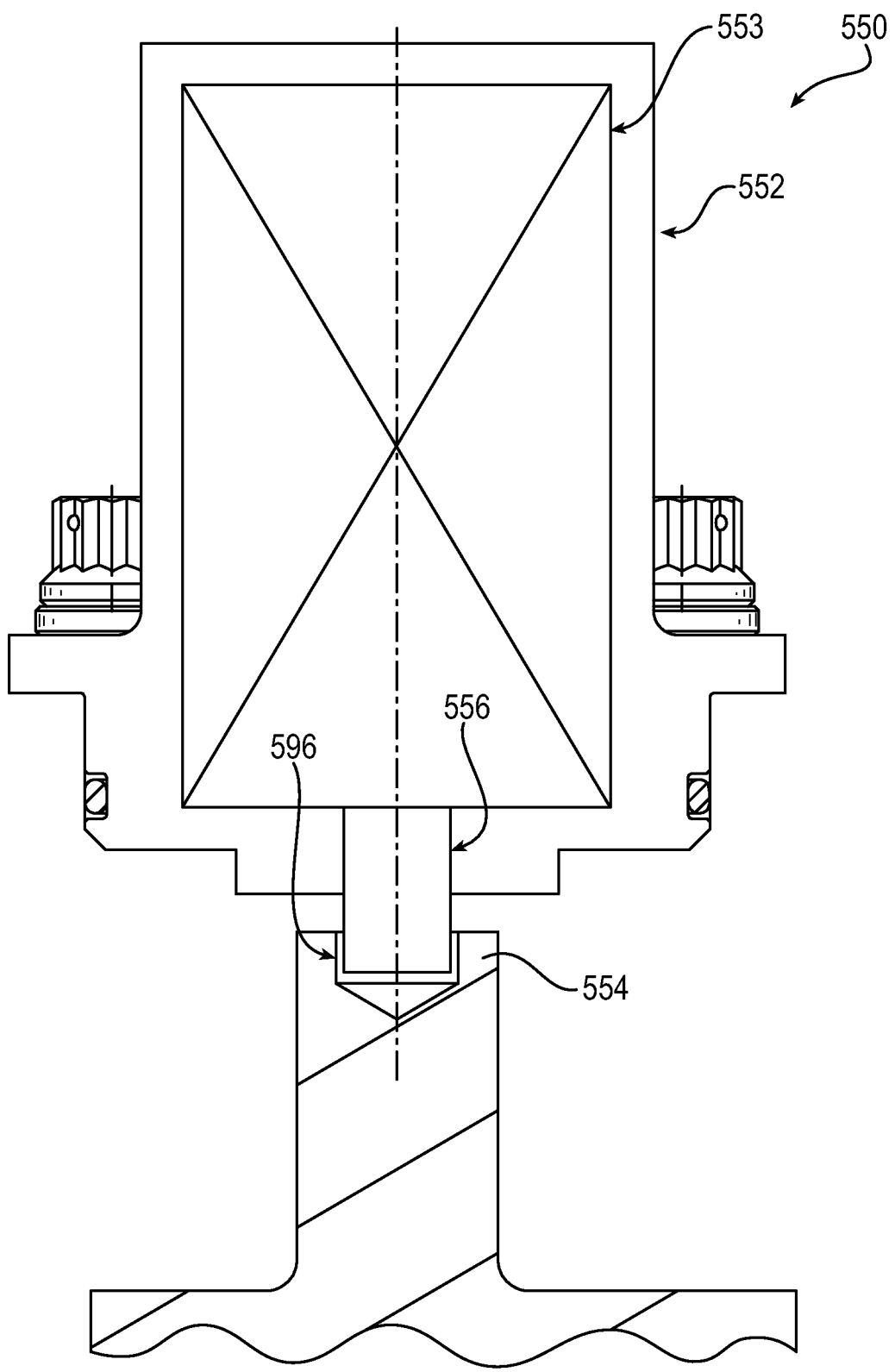
FIG. 10 is a partial elevational view of a further exemplary load detent assembly according to the present invention, partly broken away in section.
Figure 11:
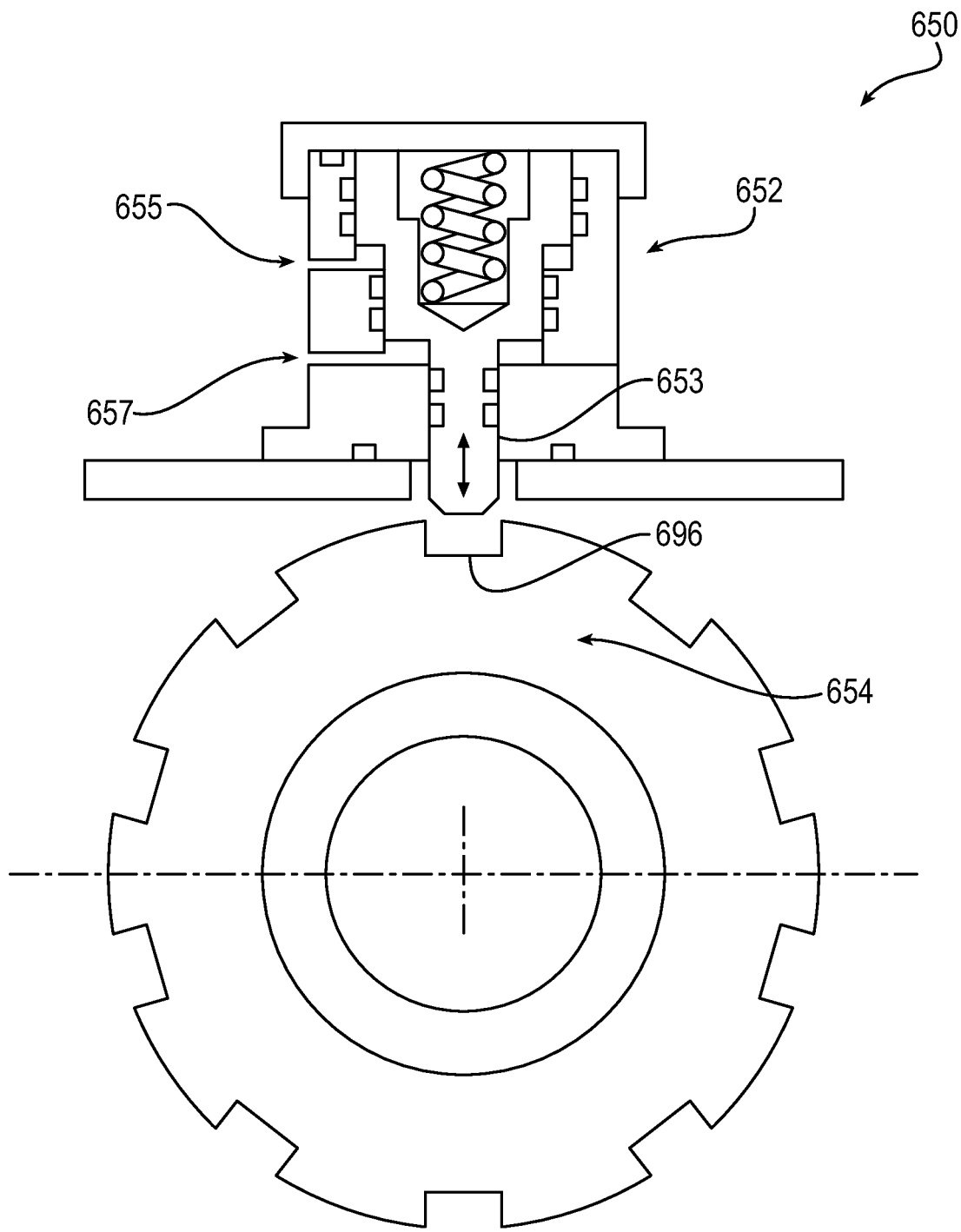
FIG. 11 is a partial elevational view of another exemplary load detent assembly according to the present invention, partly broken away in section.

Referring now to FIGS. 9-11, embodiments of HSTA's/load detent assemblies are illustrated having different load detent and engagement member structures than the load detent assemblies 150, 250 and 350 of FIGS. 5-8. Each of the embodiments of FIGS. 5-8 include a load detent having a resilient biasing member for biasing a projection, such as a roller bearing, towards a recessed region at least partially defined by one or more lobed sections/protruding portions of an engagement surface of an engagement member. FIGS. 9-11 demonstrate alternative load detent and engagement member embodiments.

Turning first to FIG. 9, a load detent assembly 450 is illustrated. An engagement member 454 includes one or more protruding portions 492 circumferentially spaced apart from one another and defining radially inwardly projecting recessed regions 496.

Turning next to FIG. 10, a load detent assembly 550 is illustrated. A load detent 552 includes a solenoid 553 for selectively driving a pin projection 556 into and out of engagement with a recessed region 596 in a corresponding engagement member 554. In such embodiment, the load detent 552 is selectively movable to the restricting position engaged with a recessed region 596 of the engagement member 554, rather than being continuously biasedly engaged with the engagement member 554. The restricting position is the default position, where the solenoid 553 may be activated to retract the pin projection 556 from position in a recessed region 596 of the engagement member 554. The solenoid 553 may be a single channel or multiple channel solenoid, for example. The corresponding engagement member 554 can include any suitable number of recessed regions 596 for receiving the projection 556 therein.

Turning now to FIG. 11, a load detent assembly 650 is illustrated including a load detent 652 having a hydraulically driven piston 653 for engaging a recessed region 696 of a corresponding engagement member 654. Fluid, such as hydraulic fluid, may be driven into opposing ports 655 and 657 for causing movement of the piston 653 between an engaging position and a retracted position. As with the embodiment of FIG. 10, a default position of the hydraulically driven piston 653 of FIG. 11 may be such that the piston 653 is engaged in a recessed region 696 of the engagement member 654.

In summary, a load detent assembly 150, 250, 250, 450, 550, 650 is provided for restricting creep of a rotating assembly 105 of an actuator 100 used to actuate an aircraft flight control surface. The load detent assembly 150, 250, 250, 450, 550, 650 includes an engagement member 154, 254, 354, 454, 554, 564 having circumferentially spaced engagement surfaces/protruding portions 192, 492, 692, and a load detent 152, 252, 353, 452, 552, 652 having a stoppage member radially biasable towards the engagement member 154, 254, 354, 454, 554, 564 for interengagement between the engagement surfaces 192, 492, 692 to restrict creep of the rotating assembly 105. One of the engagement member 154, 254, 354, 454, 554, 564 or the load detent 152, 252, 353, 452, 552, 652 is configured for rotation radially inward of the other of the engagement member 154, 254, 354, 454, 554, 564 or the load detent 152, 252, 353, 452, 552, 652 through at least 360 degrees of rotation. The other of the engagement member 154, 254, 354, 454, 554, 564 or the load detent 152, 252, 353, 452, 552, 652 is configured for being fixed radially outward of the one of the engagement member 154, 254, 354, 454, 554, 564 or the load detent 152, 252, 353, 452, 552, 652.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An actuator for moving a control surface, the actuator comprising:
   an actuator housing;
   a rotating assembly mounted in the actuator housing having a driven component that is rotatably drivable about a longitudinal axis; and
   a load detent assembly including an engagement member coupled to the driven component of the rotating assembly for common rotation through at least 360 degrees of rotation in either direction of rotation, and a load detent supported with respect to the actuator housing for movement relative to the longitudinal axis between a releasing position released from the engagement member and an engaging position interengaged with the engagement member by a biasing force for restricting rotation of the driven component of the rotating assembly relative to the actuator housing;
   an actuator when activated for moving load detent from the engaging position to the releasing position, and
   wherein the load detent is configured to be selectively movable against the biasing force by the actuator from the engaging position to the releasing position.

2. The actuator of claim 1, wherein the driven component is a first driven component that is rotatably drivable about the longitudinal axis to effect movement of a second driven component of the rotating assembly along the longitudinal axis.

3. The actuator of claim 1, wherein the engagement member is coupled to the driven component for common rotation therewith through at least 360 degrees of rotation.

4. The actuator of claim 2, wherein the driven component is a screw and the second component is a nut assembly.

5. The actuator of claim 1, wherein the load detent is supported with respect to the actuator housing for radial movement relative to the longitudinal axis.

6. The actuator of claim 1, wherein a housing for the load detent is fixed relative to the actuator housing.

7. An actuator for moving a control surface, the actuator comprising:
- an actuator housing;
- a rotating assembly mounted in the actuator housing having a driven component that is rotatably drivable about a longitudinal axis; and
- a load detent assembly including an engagement member coupled to one of the driven component of the rotating assembly or the actuator housing, and a load detent supported with respect to the actuator housing for movement relative to the longitudinal axis between a releasing position released from the engagement member and an engaging position interengaged with the engagement member for restricting rotation of the driven component of the rotating assembly relative to the actuator housing; and
- wherein the load detent is configured to be selectively movable between the engaging position and the releasing position, and
- wherein the actuator includes opposing skewed no-back roller assemblies for engaging the driven component.

8. A load detent assembly for restricting creep of a rotating assembly of an actuator, the load detent assembly comprising:
- an engagement member having circumferentially spaced engagement surfaces, and
- a load detent having a stoppage member engageable by a biasing force with the engagement member to restrict creep of the rotating assembly,
- means for selectively moving, when activated, the stoppage member against the biasing force away from the engagement member to permit rotation of the rotating assembly in either direction,
- wherein one of the engagement member or the load detent is configured for rotation radially inward of the other of the engagement member or the load detent through at least 360 degrees of rotation.

9. The load detent assembly of claim 8, wherein the stoppage member includes one of a projection or a detent and the engagement surfaces include the other of the projection or the detent, the projection and the detent being interengageable to restrict relative rotation of the load detent and engagement member.

10. The load detent assembly of claim 8, wherein the engagement member is configured for rotation radially inward of the load detent through at least 360 degrees of rotation.

11. The load detent assembly of claim 8, wherein the engagement member is annular in shape.

12. A linear actuator for moving a control surface, the actuator comprising:
- an actuator housing;
- a nut and screw assembly mounted with respect to the actuator housing and having a screw that is rotatably drivable about a longitudinal axis to drive a nut assembly along the longitudinal axis; and
- a load detent assembly including
    - an engagement member integral with the screw for common rotation through at least 360 degrees of rotation in either direction of rotation, and
    - a load detent supported with respect to the actuator housing and having a stoppage member selectively movable relative to the longitudinal axis between a releasing position released from the engagement member and an engaging position interengaged with the engagement member and restricting rotation of the screw relative to the actuator housing,
    - an actuator when activated for selectively moving the stoppage member from the engaging position to the releasing position, and
    - wherein the stoppage member is selectively movable by activation of the actuator against a biasing force acting on the load detent that urges the load detent toward the engagement member.

13. The actuator of claim 12, wherein the means for moving includes a solenoid.

14. The actuator of claim 12, wherein the actuator includes a piston.

15. The actuator of claim 12, wherein the screw has a flange, and the engagement member is at the radially outer periphery of the flange.

16. The actuator of claim 15, including opposing skewed no-back roller assemblies disposed at respective opposite axial sides of the flange.

* * * * *